1/3/84 OR 4,423,929

United States Patent [19]

Gomi

[11] 4,423,929

[45] Jan. 3, 1984

[54] MULTI-LAYER DISPLAY DEVICE

[75] Inventor: Tsuguo Gomi, Suwa, Japan

[73] Assignee: Kabushiki Kaisha Suwa Seikosha, Tokyo, Japan

[21] Appl. No.: 152,894

[22] Filed: May 23, 1980

Related U.S. Application Data

[63] Continuation-in-part of Ser. No. 853,925, Nov. 22, 1977, abandoned.

[30] Foreign Application Priority Data

Nov. 22, 1976 [JP] Japan ................................ 51-140359

[51] Int. Cl.[3] ................................ G02F 1/13

[52] U.S. Cl. ................................ 350/335; 350/332

[58] Field of Search ................................ 350/332, 335

[56] References Cited

U.S. PATENT DOCUMENTS 3,750,139 7/1973 Blishak ................................ 350/332

4,142,182 2/1979 Kmetz ................................ 350/332

FOREIGN PATENT DOCUMENTS 2448045 4/1975 Fed. Rep. of Germany ...... 350/335

1332984 10/1973 United Kingdom ................ 350/335

*Primary Examiner*—John K. Corbin

*Assistant Examiner*—Richard F. Gallivan

*Attorney, Agent, or Firm*—Blum, Kaplan, Friedman, Silberman and Beran

[57] ABSTRACT

A multi-layer display device including at least two liquid crystal display cells overlapping along a line of sight is provided. Adjacent display cell layers may share a common transparent plate therebetween. Patterns are displayed by selectively applying a voltage between opposed pattern and common electrodes. The number of signal wires removed from the device is reduced by electrically connecting electrodes in different layers. The connected electrodes may be non-overlapping to increase the number of characters which may be displayed simultaneously, or may be overlapping for independent displays.

17 Claims, 22 Drawing Figures

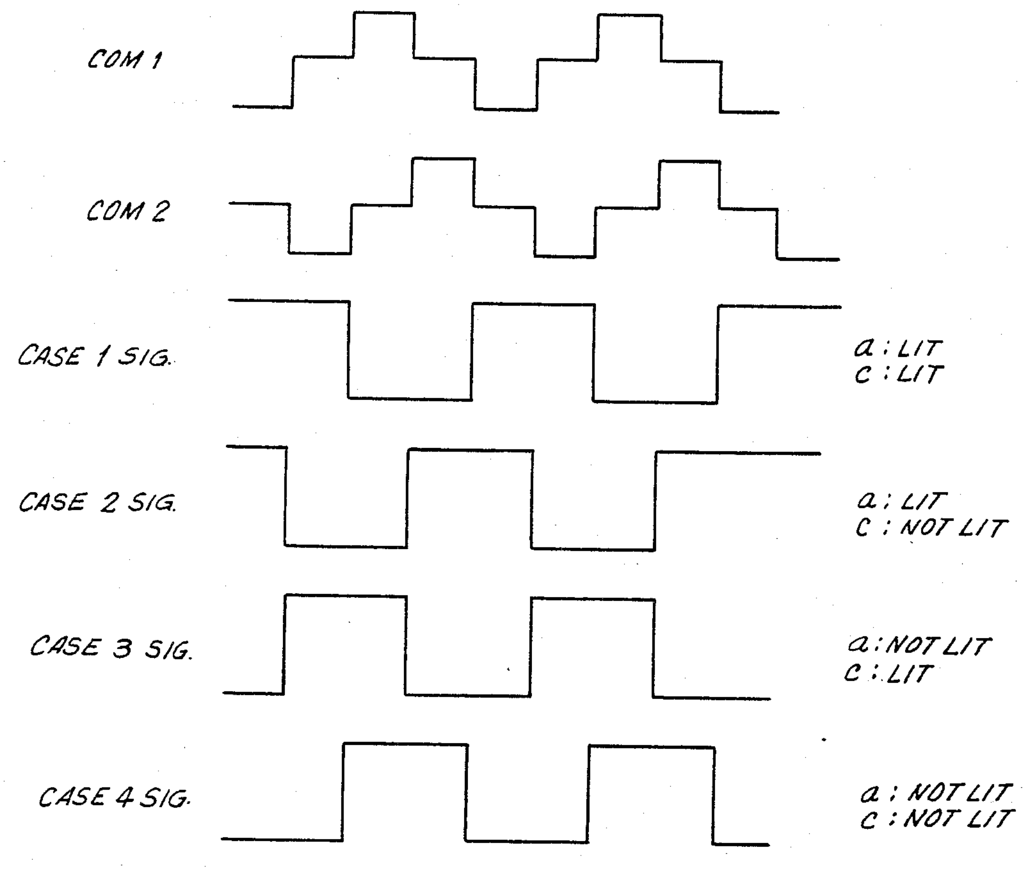
FIG. 7
FIG. 6
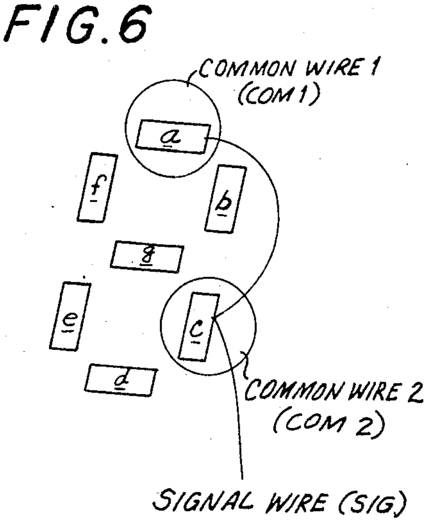
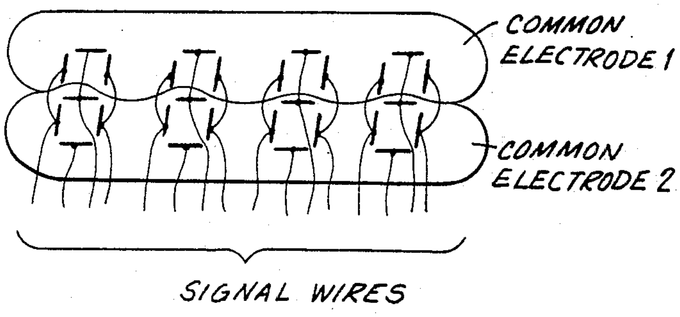
FIG. 8

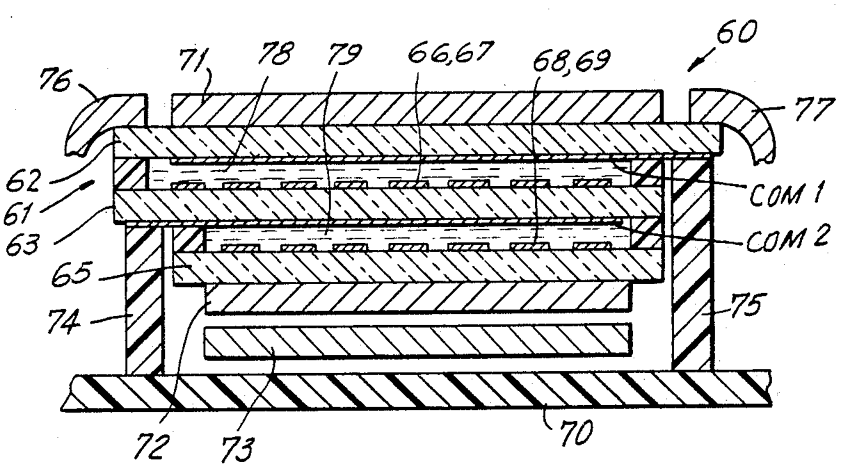
FIG. 13
FIG. 14
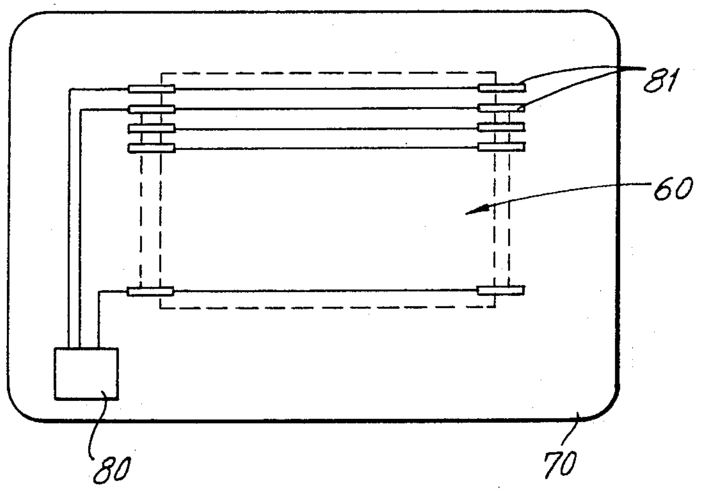

FIG. 15
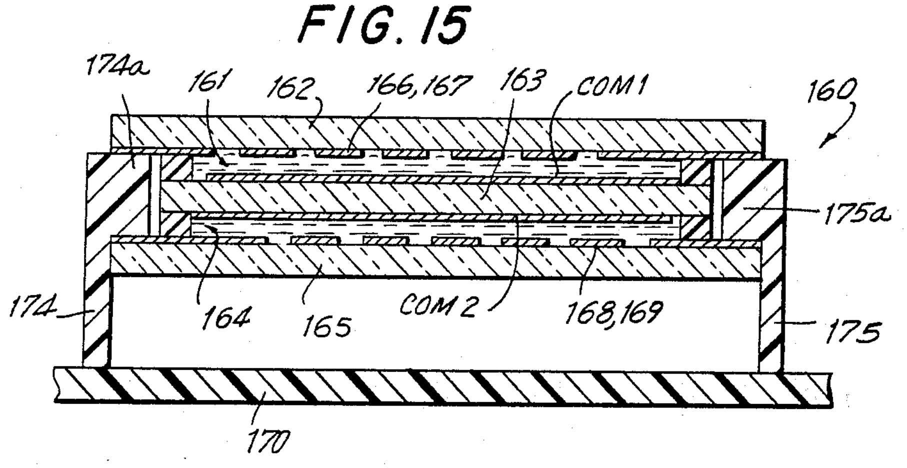
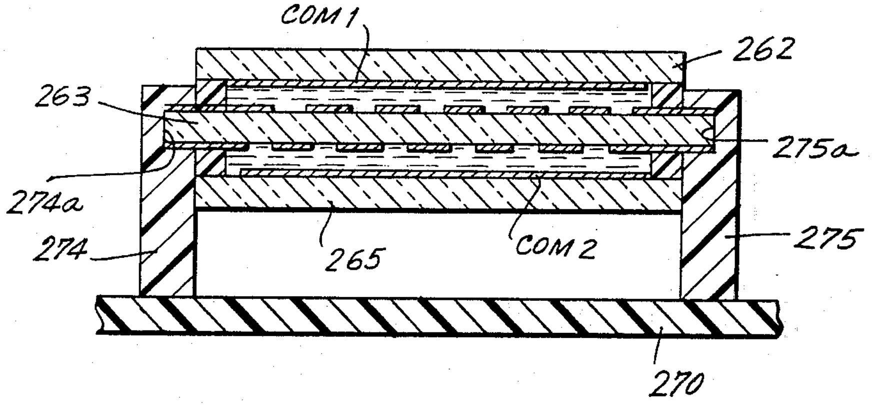
FIG. 16

FIG. 17(a)
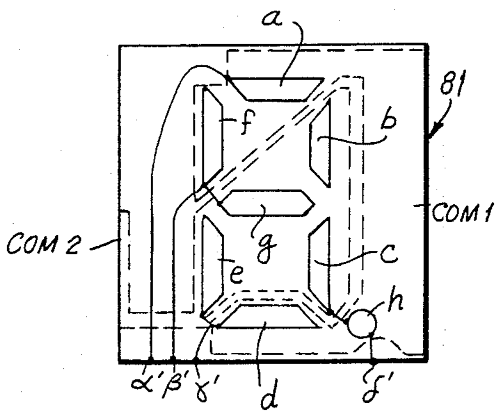
FIG. 17(b)
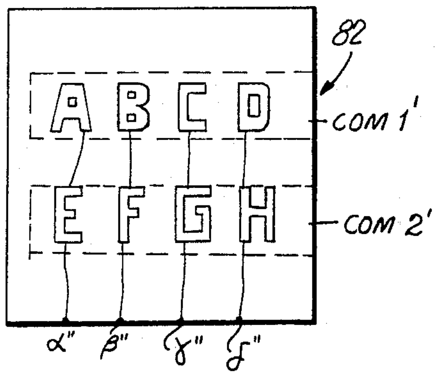
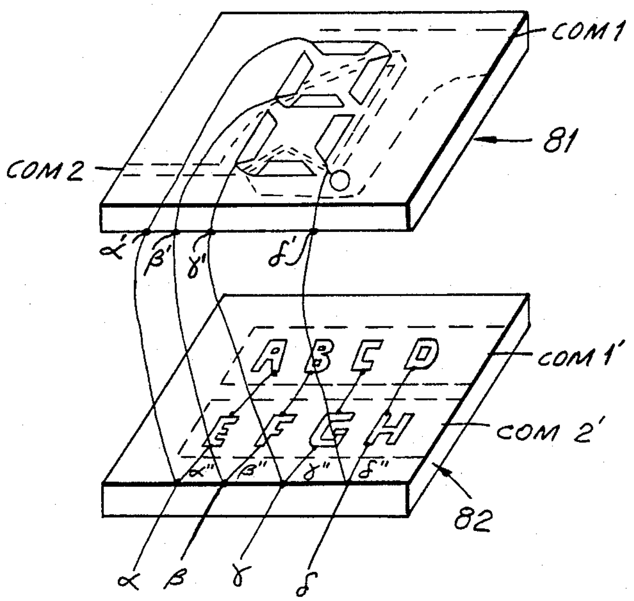
FIG. 18

MULTI-LAYER DISPLAY DEVICE

CROSS-REFERENCE TO RELATED APPLICATION

This application is a continuation-in-part of my co-pending application Ser. No. 853,925, filed on Nov. 22, 1977, abandoned.

BACKGROUND OF THE INVENTION

This invention relates generally to a display device, and in particular to an improved multi-layer display device. Due to the increasing popularity of digital display electronic devices, such as digital display wristwatches, the devices have become multi-functional, displaying more complicated displays than simply the hour-minute display or the hour-minute-second display. Naturally, there is a limitation on the total number of figures and symbols which can be displayed on a restricted flat surface of an electronic wristwatch. One method for increasing the number of display figures and symbols is to make each display figure and symbol smaller or decrease the space provided between each display pattern.

As the number of desired display figures and symbols increases with an increasing number of functions, and the figures have become smaller and more difficult to read by a user, the essential object of an electronic timepiece to display the time is lost. Moreover, as the distance between respective segments of the display has narrowed, the manufacturing technique becomes more difficult, the cost increases and the efficiency decreases. This limitation on the number of displayed symbols is one cause for limiting the functions which may be included in an electronic wristwatch and is a limitation on the basic design of the timepiece.

When it is desired to display as much information as possible in a restricted planar space in a display device, in for example a wristwatch, the number of terminals which must be removed from the display increases. Specifically, when the display device is activated by the conventional simplex drive, one signal electrode and common electrode are applied to each pattern electrode or individual segment of a pattern electrode. When a conventional seven segment alpha-numeric character is formed by the segmented pattern electrodes, fourteen terminals (seven signal and seven common) are required for displaying each character.

The multiplex drive, such as the V-2 V driving method has been adopted wherein two different segments of the pattern electrode share a common signal were and two different common electrode are opposed to the segment for selectively activating these portions of the display pattern. This permits reduction of the number of signal wires which must be withdrawn to six for each seven member segmented display. However, this method has inherent shortcomings as any two segments cannot be connected as desired. It is impossible to position each common electrode and at the same time remove the signal wires in the restricted space.

An additional shortcoming of the conventional multiplex drive is that it has two segments of the same character being electrically connected to the same signal electrode. This presents a problems in a functional test of the system, for example in wristwatches including LSI. In this case it is necessary to test or inspect the state of both common electrodes in order to determine what character is displayed by the single digit. Accordingly, the test pattern for the LSI tester involves more time.

Accordingly, it would be desirable to improve the capability of displaying a greater number of figures and symbols in the restricted display area of a small electronic device, such as a digital display electronic wristwatch.

SUMMARY OF THE INVENTION

Generally speaking, in accordance with the invention, an improved digital display device including a plurality of individual display cells overlapping along a line of sight is provided. A liquid crystal display device constructed in accordance with the invention includes at least two display cells of opposed transparent plates, the cells overlapping in plan view. Transparent pattern electrodes are provided on one interior surface of one plate of each cell and at least one transparent common electrode is disposed on the opposed transparent plate of that cell. The transparent pattern electrodes are for forming display patterns when a voltage is selectively applied between segments of the pattern electrodes and the opposed common electrodes. Adjacent display cell layers may share a common transparent plate therebetween with transparent electrodes deposited on both surfaces of the common plate. The segments of the pattern electrodes may form the seven bar alpha-numeric segmented characters or may form a complete number or letter.

In a first embodiment of the invention, the display patterns on one of the display cells does not overlap the segments of the display pattern on another of the display cells. Each cell includes a single common electrode and each corresponding segment of the electrode pattern of each cell is electrically connected. This configuration of electrodes on the different cells increases the number of individual characters which may be displayed without a proportional increase in the number of signal wires which must be removed from the device.

In another embodiment of the invention, the segments of the display patterns in one layer overlap the segments of the display pattern in another layer. At least two segments of the pattern on each layer are electrically connected and each layer includes at least two common electrodes. This permits independent display of each layer for displaying an increased number of functions with the minimum number of signal wires.

The net result of constructing a multi-layer device in accordance with the invention is to increase the complexity of the display patterns which may be displayed in a display device having a fixed planar space, such as an electronic wristwatch. Additionally, this simplifies depositing electrode patterns and increases LSI testing of the device during operation.

Accordingly, it is an object of this invention to provide an improved digital display device.

Another object of the invention is to provide an improved display device for displaying an increased number of display patterns.

A further object of the invention is to provide an improved multi-layered digital display device including at least two overlapping display cells.

Still another object of the invention is to provide an improved multi-layered display device wherein at least a portion of the display pattern of one layer overlaps a portion of the display pattern of another layer which are connected electrically outside the cell for independent display of each connected pattern.

Another object of the invention is to provide an improved multi-layered display device wherein at least a portion of the display pattern of one layer does not overlap with a portion of the display pattern of another layer for simultaneous display of each pattern which is connected electrically outside the cell.

A further object of the invention is to provide an improved digital display electronic wristwatch including a multi-layered display panel.

Still other objects and advantages of the invention will in part be obvious and will in part be apparent from the specification.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 6 illustrates the segmented pattern electrodes for a seven member alpha-numeric character;

FIG. 7 illustrates the driving waveform for the display of FIG. 6;

FIG. 8 illustrates an electrode pattern for a V-2 V multiplex drive for the seven member alpha-numeric characters;

FIG. 13 is a side elevational cross-sectional view of a liquid crystal display device constructed and arranged in accordance with the embodiment illustrated in FIGS. 9–11;

FIG. 14 is a plan view illustrating the electrical connections to the circuit substrate for the display device of the type illustrated in FIG. 13;

FIG. 15 is a side elevational cross-sectional view of a multi-layer liquid crystal display device illustrating the electrical connection of signal electrodes to the circuit substrate;

FIG. 16 is a side elevational cross-sectional view illustrating the electrical connection of common electrodes to the circuit substrate;

FIG. 17(*a*) is a plan view of the pattern electrodes in the first layer of a liquid crystal display device in accordance with the invention;

FIG. 17(*b*) illustrates the pattern electrodes in the second layer of the device of FIG. 17(*a*);

FIG. 18 is an exploded perspective view illustrating the electrode patterns and electrical connections in the two layers of a display device including the panels of FIG. 17(*a*) and FIG. 17(*b*);

FIG. 20(*b*) is a plan view of the display panel of the watch of FIG. 20(*a*) in a calendar display mode.

DESCRIPTION OF THE PREFERRED EMBODIMENTS

Figure 1:
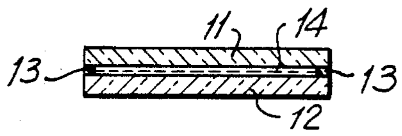
FIG. 1 PRIOR ART
FIG. 1 is a cross-sectional view of a conventional liquid crystal display cell.

In FIG. 1, a conventional liquid crystal display cell is shown. The display cell includes an upper and a lower transparent plate 11 and 12 and a sealing spacer 13 about the periphery of plates 11 and 12 for defining a space therebetween. When transparent plates 11 and 12 are formed from a transparent insulating material such as glass, the interior surfaces of the glass may be rubbed in single direction for orienting a liquid crystal material 14 placed therebetween. Transparent electrodes (not shown) are deposited on the interior surfaces of plates 11 and 12 prior to rubbing for imposing an electric field thereacross to render the liquid crystal composition between the display pattern of electrodes selectively visually distinguishable from the remainder of the liquid crystal composition.

Figure 2:
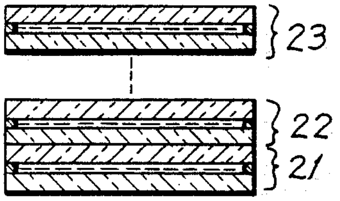
FIG. 2 is a cross-sectional view of a multi-layered display device.

Referring now to FIG. 2, a multi-layered display device formed by stacking individual display cells of the type illustrated in FIG. 1 is shown. A first display cell layer 22 is shown positioned beneath a second display cell layer 22 and an nth display cell layer 23 is depicted as the upper layer of the device. Each display cell layer is bonded to each adjacent display cell layer by a transparent binding agent.

The multi-layered display device illustrated in FIG. 2 represents one embodiment of the invention wherein the number of display patterns which may be displayed by the device is increased by providing different display patterns on each layer. While the capability of displaying an increased number of displays is increased, a multi-layer display device of n layers constructed in this manner is not fully suitable for use in a small electronic device, such as an electronic wristwatch due to the relative thickness of the display compared to the conventional single layer display cell of FIG. 1.

Figure 3:
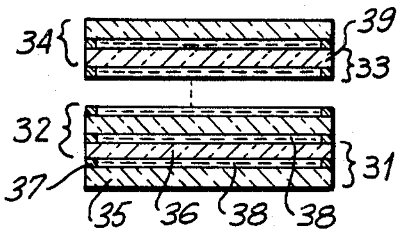
FIG. 3 is a cross-sectional view of another multi-layered display device.

Referring now to FIG. 3, another embodiment of a multi-layered display device constructed and arranged in accordance with the invention is illustrated. The multi-layer display device of FIG. 3 includes a first display cell layer 31, a second display cell layer 32 piled thereon, an (n-1)th display cell layer 33 and an nth display cell layer 34 as the upper layer of the display device. First display cell layer 31 includes a lower glass plate 35, an upper glass plate 36 and a spacer 37 about the periphery of the plates for defining a space therebetween for a liquid crystal display material 38. Upper glass plate 36 of first display cell layer 31 is common to second display cell layer 32 and is the lower glass plate for second display cell layer 32. Transparent electrodes (not shown) are deposited on the interior or upper surface of bottom plate 35 and the lower surface of first display cell layer upper plate 36. As first display cell layer upper plate 36 is also the lower plate for second display cell layer 32, transparent electrodes are deposited on the surface thereof. Each successive display cell layer is constructed and arranged in a similar manner. For example, an upper glass plate 39 of (n-1)th display cell layer 33 is the lower glass plate for nth display cell layer 34.

By constructing and arranging the multi-layered display cell illustrated in FIG. 3 in this manner, a display device having n layers includes n+1 glass plates rather than 2n glass plates that would be required in a multi-layered display device constructed and arranged in accordance with the device illustrated in FIG. 2. Improved display capability is obtained without doubling the number of glass plates in the device thereby reducing the thickness of the display. This reduction in thickness of the display makes the improved multi-layered display device as illustrated in FIG. 3 suitable for use in small electronic devices, such as digital display electronic wristwatches.

The multi-layered display devices illustrated in FIGS. 2 and 3 are preferably operated by a multiplexed driving system (not shown) similar to that used in conventional single layer display devices as illustrated in FIG. 1. In a multiplexed driving system the respective digits or parts thereof are driven dynamically and sequentially for each period of a driving signal. The respective digits of the display are generally defined by segments arranged in a seven-bar display and one or more common electrodes as illustrated in FIG. 6. In FIG. 7 the voltage driving waveforms for driving pattern electrode segments a and c by the same signal (SIG), which are opposed to two common electrodes (COM 1 and COM 2, respectively) are shown. The condition of the display for each signal is set forth. The two segments can be driven for one period of the driving signal by applying signals which are shifted by a quarter of the period to two common electrodes. The number of pads of an integrated circuit can be reduced by half, since two segments may be connected to one terminal in the in the multiplexed driving system, so that the apparent capability of the display doubles.

The multiplexed driving system utilized in the conventional display device is limited to that no more than two segemens which are in close proximity on a plane may be combined. This is the case because a combination of two distinct segments of the display pattern in a display cell limits the total number of other combinations due to the limited number of segments. It has also been generally considered necessary to combine two segments aligned on a line which radiate from the center of a display cell. A specific electrode pattern with adjacent segments connected for receiving the same signal is shown in FIG. 8. In this drive system, two common electrodes are provided. However, it is not always convenient to combine two such aligned segments. When it becomes necessary to inspect the circuit, inspection is facilitated if the two combined segments are related to each other. However, where the aligned segments combined for driving are not so related, inspection becomes substantially more difficult.

Figure 4:
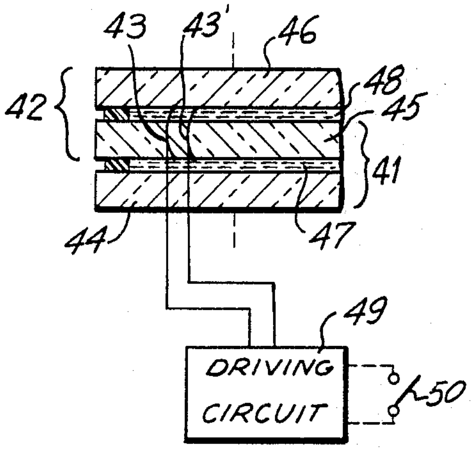
FIG. 4 is a cross-sectional view of a portion of the multi-layered display device illustrated in FIG. 3 with a schematic illustration of a driving circuit and switch of the device.

Referring now to FIG. 4, a section of two layers of a multi-layered display device constructed in accordance with the embodiment depicted in FIG. 3 is shown. In FIG. 4 an ith display layer 41 is formed with a lower glass plate 44 and an upper glass plate 45 and a liquid crystal material 47 therebetween. An (i+1)th display cell layer 42 is formed with upper glass plate 46 and a liquid crystal material 48 therebetween. Each glass plate 44, 45 and 46 in ith and (i+1)th display cell layers 41 and 42, respectively, are formed with transparent electrodes deposited on the respective interior surfaces adjacent to liquid crystal material 47 and 48. Thus, glass plate 45 which is the upper glass plate for ith display cell layer 42 has transparent electrodes deposited on both surfaces. Segments of the display elements in ith display cell layer 41 and (i+1)th display cell layer 42 are connected outside the display cell layers, as shown by way of example and schematically, by electrodes 43 and 43'. Normally more than two such connecting electrodes would be provided, one for each segment type. A driving circuit 49 shown schematically is a suitable conventional driving multiplexed circuit incorporating an integrated circuit electrically connected to the electrodes on the respective surfaces of the cells for multiplexed driving of the segments of the digital display in a well-known manner. Thus, by way of example, corresponding segments from a plurality of digits may be electrically connected together for receiving pulsed data segments. Pulsed timing signals are sequentially applied to the common electrodes of each digit. A segment is rendered visible when its voltage across the liquid crystal material between a simultaneously energized segment and common electrode is of sufficient level. The flickering of the display segments is not detected due to retinal detention. Due to the electrode connecting segments on the ith and (i+1)th display layers, digits on different display layers can be sequentially energized by the multiplexed driving circuit in a conventional manner. A switch 50 shown in phantom may be provided coupled to control an output gate from driving circuit 49 for the selective energization of one or the other of the connected layers. The switch would control application of signals to the common electrodes. A two position switch may be provided for selecting one of the layers, or a three position switch or other selection arrangement may be provided for connecting one or both of the connected layers.

Figure 9:
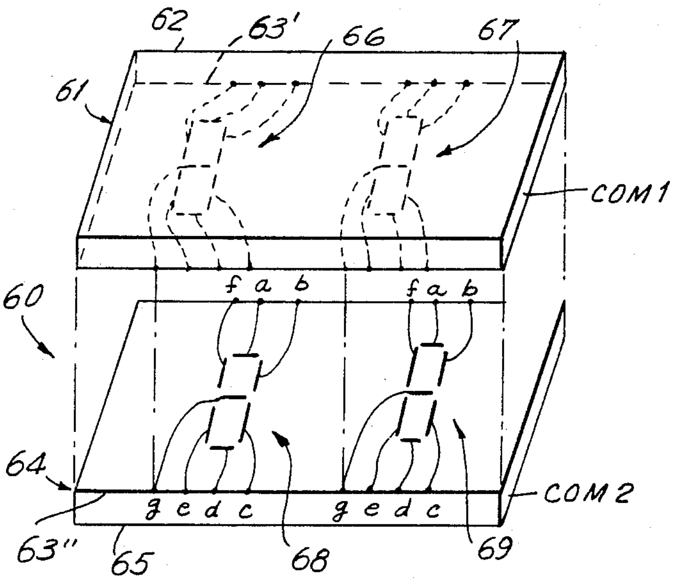
FIG. 9 is an exploded perspective view illustrating the electrode patterns in a multi-layer device constructed and arranged-in accordance with the invention.
Figure 11:
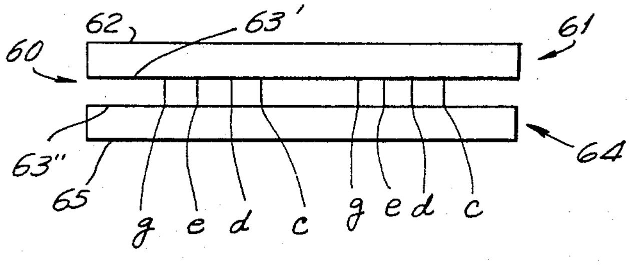
FIG. 11 is a side elevational view of the device of FIG. 9 illustrating the electrical connection outside the cells.
Figure 10:
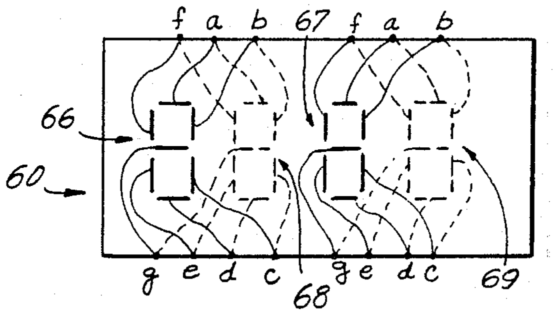
FIG. 10 is a plan view of the device of FIG. 9.

The specific electrode configuration for use in such a device constructed and arranged in accordance with the invention is shown in FIGS. 9–11. In this embodiment of the invention the characters formed by the pattern electrode segments on the two layers of the display device do not overlap along the line of sight through the display cells. By arranging the device in accordance with this embodiment of the invention, the number of signal wires removed from the device is proportionally less than would be removed in the conventional multiplexing method of FIG. 8.

In the embodiment of FIGS. 9–11, a display device is shown generally as 60. Device 60 includes a first or upper display cell 61 which is formed from an upper transparent panel 62 and an opposed lower transparent panel 63'. Device 60 also includes a second or lower cell 64 which is formed from an upper transparent panel 63" and a lower opposed transparent panel 65. In accordance with the embodiments described, lower panel 63' of upper cell 61 and upper panel 63" of lower cell 64 may be one panel 63 in order to reduce the number of transparent panels in the device.

The transparent electrodes of liquid crystal display device 60 have been deposited in accordance with the invention in order to overcome the shortcomings of the prior art electrode configurations. Accordingly, the pattern electrodes for adjacent digits of the display in first cell 61 and second cell 64 do not overlap and characters selectively formed therefrom may be displayed simultaneously. In order to accomplish this, each segment of the seven bar display is connected to an individual signal wire and each display cell includes one opposed common electrode. Specifically, upper cell 61 includes a first seven bar display 66 and a third seven bar display 67, each seven bar display including pattern electrode segments a–g, inclusive deposited on the upper surface of lower panel 63'. A single common electrode COM 1 is deposited on the opposed lower surface of upper panel 62.

Second cell 64 includes a second seven bar display 68 and a fourth seven bar display 69 which are deposited so that the display panel appears as illustrated in the plan view in FIG. 10. The segmented pattern electrodes for second seven bar display 68 and fourth seven bar display 69 are deposited on the lower surface of upper panel 63" and a single common electrode COM 2 in second cell 64 is deposited on the upper surface of lower panel 65.

In this embodiment illustrated in FIGS. 9–11, first cell 61 includes a first common electrode COM 1 deposited on the inner surface of panel 62 and second cell 64 includes a second common electrode COM 2 deposited on the upper surface of panel 65. As shown in FIGS. 10 and 11, each corresponding bar in first display 66 and adjacent display 68 are electrically connected by a signal wire at the edge of the cells. Thus, upper segment a of both displays 67 and 68 are connected at a terminal illustrated by a. The same electrode removal pattern is present for third display 68 and adjacent fourth display 69. By this construction, the seven signal wires leading from segment a to g can be taken out to the edge of the transparent plates without being obstructed by the adjacent digits. The seven signal wires from display 66 and adjacent display 68 are joined outside the display as illustrated in the elevational view in FIG. 11. The signal wire for the two electrically connected displays are then connected to the control circuit of the LSI as if the signal wires were leading to a single display. The pattern of removing the electrodes can also be seen in the perspective presentation of FIG. 9.

Turning to FIG. 10, it can be seen that the pattern electrode for displays 66 and 67 on first cell 61 and electrode patterns for displays 68 and 69 on second cell 64 are in a non-overlapping relation in plan view. The signal wires leading from pattern electrodes on lower panel 63' of first cell 61 and the signal wires from corresponding segments of the pattern electrodes on upper panel 63" of lower cell 64 lead to the same position at the edge of the cells 61 and 64 when viewed from above. As will be shown in FIG. 13, 15 and 16 in more detail below, signal wires removed from the panels are connected by conductive material to the circuit substrate for electrical connection to the circuit.

Figure 12:
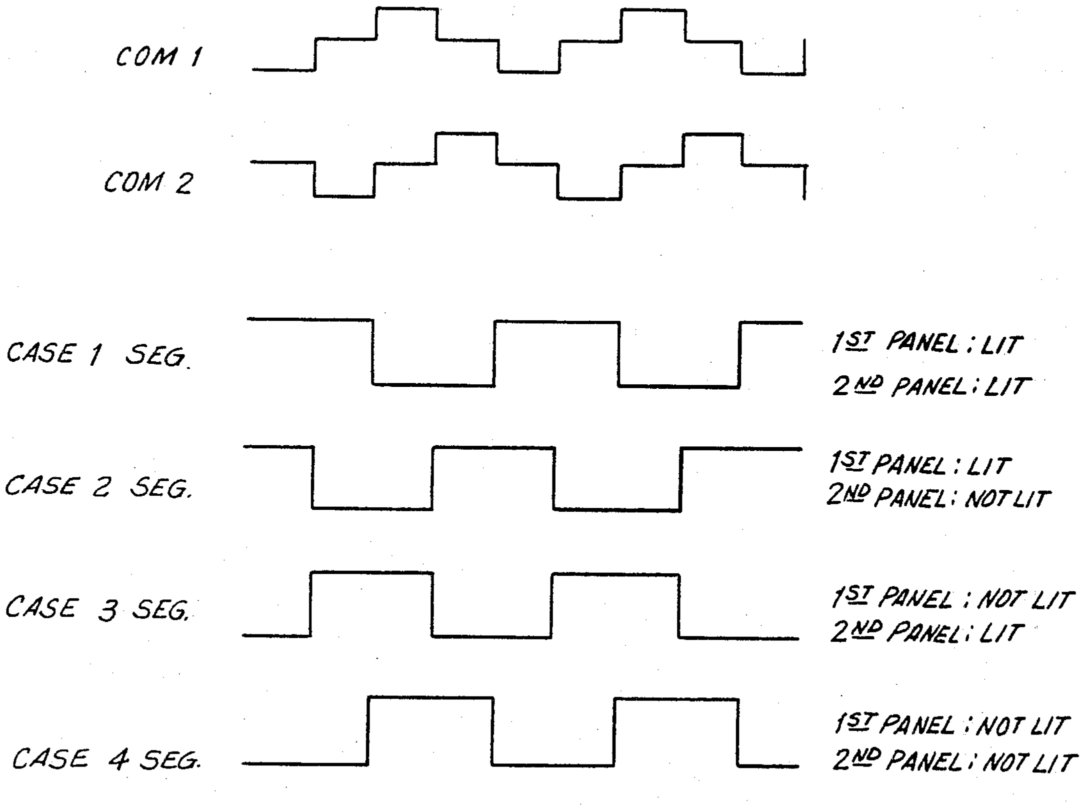
FIG. 12 are the driving waveforms for the display device illustrated in FIGS. 9–11.
Figure 19A:
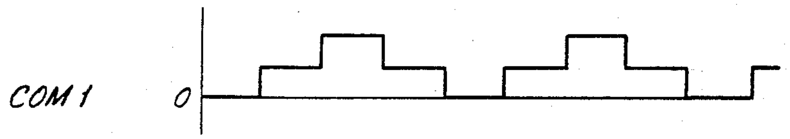
FIG. 19 are the driving waveforms for driving the display device illustrated in FIG. 18.
Figure 19B:
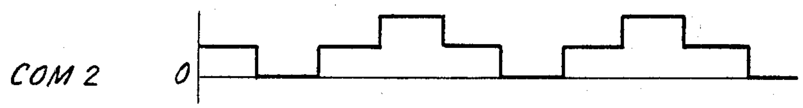
Figure 19C:
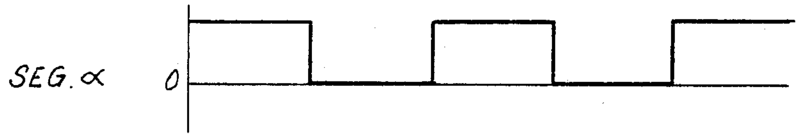
Figure 19D:
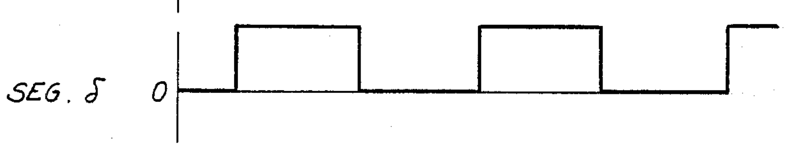
Figure 19E:
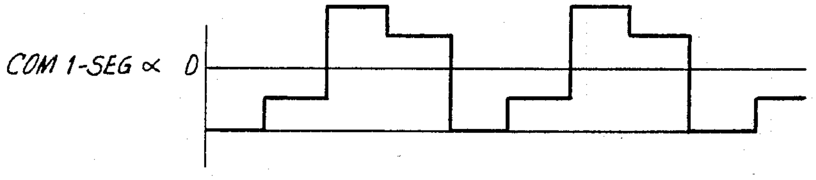
Figure 19F:
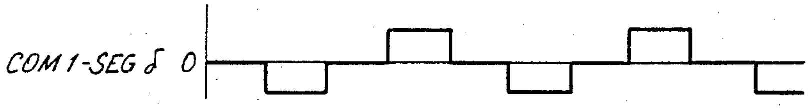
Figure 19G:
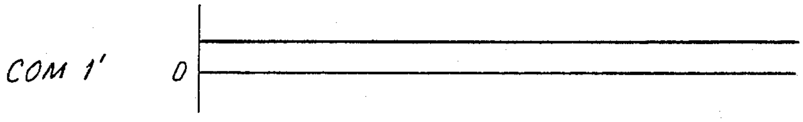
Figure 19H:
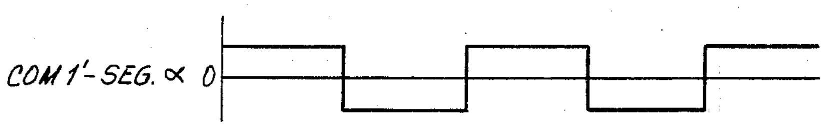
Figure 19I:
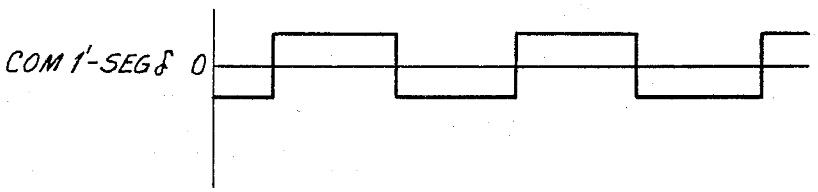

FIG. 12 illustrates the voltage driving waveforms applied to the device of FIGS. 9–11. The waveform indicated as COM 1 in FIG. 12 is applied to the first common electrode COM 1 deposited on the lower surface of upper panel 62 of upper cell 61. Similarly, waveform indicated as COM 2 in FIG. 12 is applied to the common electrode COM 2 deposited on the upper surface of lower panel 65 of second cell 64. Signal electrodes as indicated in cases 1–4 are selectively applied to each of the segment signal wires. Accordingly, the display pattern rendered visually distinguishable can be varied as desired.

Referring to FIG. 12, when the signal of case 1 is applied to one of the segment signal terminals, the segment in first cell 61 and the corresponding segment in second cell 64 are both displayed. When the signal of case 2 is applied to at least one of the segment signal terminals, the corresponding segments on first cell 61 are displayed, while those in second cell 64 are not displayed. In the case that the signal of case 3 is applied to at least one of the segment signal terminals, the corresponding segments on first cell 61 are not displayed, but those on second cell 64 are displayed. Further, when the signal of case 4 is applied to at least one of these second signal terminals, none of the segments on first cell 61 or second cell 62 are displayed.

For example, when the signal of case 2 is applied to each of the segment signal terminals connected to first display 66 and second display 68 and also applied to each segment signal terminal connected to third display 67 and fourth display 69, the "8 8" display illustrated in FIG. 10 appears. Similarly, if the signal of case 2 is applied to terminals a, b and c, a "7 7" of display 66 and display 67 will be displayed. On the other hand, when the signal of case 3 is applied to segment signal terminals b and c, "1 1" is displayed in positions of display 68 and display 69.

Figure 20A:
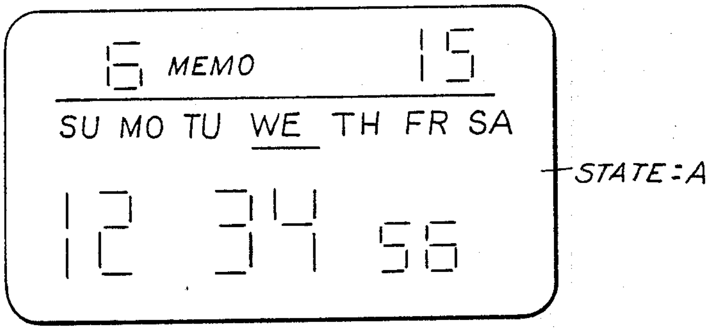
FIG. 20(*a*) is a plan view of the display of actual time and date in an electronic timepiece including a liquid crystal display device in accordance with the invention.
Figure 20B:
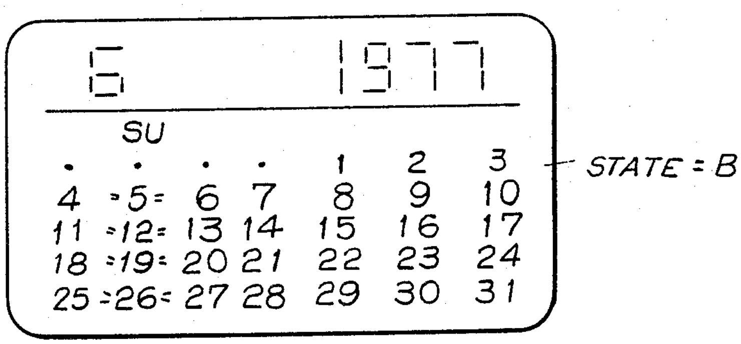

Accordingly, by providing COM 1 in upper cell 61 and COM 2 in second cell 64 and by selectively applying signals of cases 1–4 to each terminal a–g, inclusive, with the segment electrode on upper cell 61 and corresponding segment electrodes on second cell 64 being electrically connected by signal wires to a common signal terminal, the desired alpha-numeric figures can be displayed by means of displays 66, 67, 68 and 69. The characters in device 60 are of the conventional seven bar type. However, it is contemplated that other patterns can be utilized. Such patterns may be of entire letters or numerals as illustrated in FIGS. 20(*a*) and 20(*b*).

In the construction of the multi-layered display device in this manner, segments of display patterns on successive layers may be connected. In addition, segments of non-successive display cells may also be connected in any manner desired. Therefore, display patterns of the display cells can be arranged in a suitable manner which will permit the most efficient utilization of the display face. In addition, a display device constructed in this manner makes it possible to inspect the integrated circuit easily by inspecting the output of one terminal at a time of the combined segments since the combined segments can be related. This results from the reduced density of electrodes on each surface, permitting interconnection on other than radial lines as discussed above.

By utilizing a device constructed in this manner, many physical images may be displayed by using a common segment of the display pattern for substantially increasing the type of displays possible. For example, display segments of a seconds display may be used for segments of an overlapping months display. When such overlapping of portions of the displays, it is not possible to display the second display and the months display at the same time, although such simultaneous display is possible if the respective month and seconds displays on different display cell layers are sufficiently offset.

Figure 5:
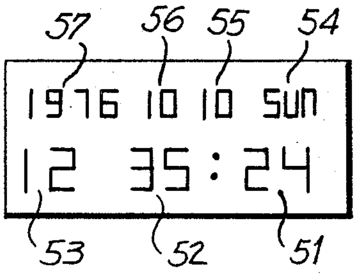
FIG. 5 is a plan view of a wristwatch face including a multi-layered display device constructed and arranged in accordance with one embodiment of the invention.

Referring now to FIG. 5, a display face of an electronic wristwatch including a multi-layered display device constructed and arranged in accordance with the invention is illustrated. The display face includes a seconds display 51, a minutes display 52 and an hours display 53. Each of these displays is arranged on one layer of the multi-layered display device. Preferably, seconds display 51, minute display 52 and hours display 53 are displayed on an upper layer of the device in order to provide a display pattern of increased contrast, since the upper layer is generally brighter. The display also includes a day of week display 54, a days display 55, a months display 56 and a years display 57. Each of these latter date display patterns is displayed at a lower display cell layer so that when all patterns on both layers are displayed at the same time, the time digits are displayed more clearly than the date display digits at the lower display cell layer. Display digits of the same size and configuration are preferably disposed on the same display cell layer. If desired, the display can be changed easily from one layer to the other for displaying one of the display patterns by operating a micro-switch as exemplified by switch 50 of FIG. 4. If all the displays at the different layers are energized at the same time, the display layers can be distinguished by the difference in contrast of the display pattern on different layers due to the difference in depth, the display on the lower layer appearing darker. In a wristwatch including such a display device, it would be preferable to arrange the hour-minute-second display in the upper display layer. Even though the light transmission of glass is about 90%, the display patterns at the lower display cell layers are visible, albeit, darker when several layers of glass plates are stacked one on top of each other.

Referring now to FIG. 13, a cross-sectional view of a display device 60 constructed in accordance with the embodiment in FIGS. 9–11 is shown with like reference numerals. Device 60 is mounted on a circuit substrate 70 sandwiched between a first or upper polarizer 71 and a second or lower polarizer 72. A reflector 73 is disposed beneath lower polarized 72 for reflecting light passing through the device 60. The lower panel of upper cell 61 in the upper panel of lower cell 64 are coincidental and shown as panel 63. Device 60 is shown with a first liquid crystal material 78 in first cell 61 and a second liquid crystal material 79 in second cell 64. Liquid crystal materials 78 and 79 may, of course, be of the same type or of a different type.

Display device 60 is mounted on circuit substrate 70 by means of a first resilient conductive member 74 disposed between substrate 70 and the lower surface of panel 63. A second resilient conductive member 75 is disposed between substrate 70 and the lower surface of upper panel 62 of first cell 61. First and second resilient conductive member 74 and 75 are compressed by a first retaining clip 76 and a second retaining clip 77, respectively.

In this construction, common electrode COM 1 in first cell 61 and segmented pattern electrodes for first display 66 and third display 67 are connected to circuit substrate 70 by resilient conductive member 75. Similarly, the common electrode COM 2 in second cell 64 on the lower surface of panel 63 and the segmented display electrodes of second display 68 and fourth display 69 on the upper surface of panel 65 are electrically connected to circuit substrate 70 by resilient conductive member 74. It is of course within the contemplation of the invention that the respective positions of the common electrodes and the segmented display electrodes may be reversed. In other words, in first cell 61 the common electrode COM 1 may be deposited on the upper surface of panel 63 and the segmented display electrodes for first display 66 and third display 67 may be deposited on the lower surface of first panel 62. This same arrangement may be utilized in second display 64, if desired.

Turning now to FIG. 14, the method of making electrical connections to circuit substrate 70 is shown in detail. A plurality of lead terminal 81 are disposed on both sides of display device 60 for making electrical connection to an integrated circuit IC 80.

FIGS. 15 and 16 illustrate means for connecting the electrodes in each cell to the resilient conductive members. For example, in FIG. 15, a device 160 has an upper cell 161 with a common electrode COM 1 disposed on the upper surface of a common panel 163 and a second cell 164 with a common electrode COM 2 disposed on the lower surface of common panel 163. Segmented signal electrodes 166 and 167 are disposed on the lower surface of an upper panel 162 and segmented signal electrodes 168 and 169 are disposed on the upper surface of an lower panel 165.

In the construction of FIG. 15, upper panel 162 and lower panel 165 each extend in two opposed directions beyond common panel 163. A first resilient conductive member 174 includes a region **174*a* for electrically contacting signal electrodes 166 and 167 disposed on the lower surface of upper panel 162 and electrodes 168 and 169 on the upper surface of lower panel 165. Similarly, a second resilient conductive member 175 also includes a region 175*a* for electrically contacting the signal electrodes drawn to the extended portions of panel 62′ and 65′** on this side of the device.

In FIG. 16, segmented pattern signal electrode are disposed on both surfaces of a common plate 263. In this construction common plate 263 extends beyond upper panel 262 and lower panel 265. Segmented electrode signal wires withdrawn along the extended regions of common panel 263 are electrically connected to substrate 270. A first resilient conductive member 274 including a groove **274*a* for compressively receiving panel 263 to electrically connect the signal electrodes withdrawn in this region. Similarly, second resilient conductive member 275 is also formed with a groove 75*b*″ for electrically connecting the pattern electrode signal wires withdrawn in this region of the extension of common panel 263**.

Accordingly, by constructing and arranging a multilayer liquid crystal device, one may freely display patterns on either the first or second layer as desired. In order to display a pattern only in a second cell, one need only apply waveforms of case 3 of FIG. 12. Therefore, there is no need to provide a switch mechanism for switching between the various displays. Such switch mechanisms become cumbersome and are often troublesome in assembly of the device. It is of course possible to construct the device so that the entire display portion is displayed in this manner. Alternatively, such a display method may be applied to just a region of the display panel leaving the remaining portion of the display to be driven by the conventional driving method of FIGS. 6–8 which require alternating between the panel to be performed by means of a switch.

Turning now to FIGS. 17(*a*), 17(*b*) and 18, a further embodiment of the invention is shown. The segmented pattern electrodes in this embodiment of the invention have been arranged so that a seven bar display of FIG. 17(*a*) may be displayed in a first or upper panel 81 and the capital letters of the alphabet from A to H, inclusive, can be displayed in a second or lower panel 82. These patterns are displayed by the multiplex drive system with ½ duty and ½ bias. In other words, each of first cell 81 and second cell 82 is provided with two common electrodes. The specific electrodes included are as follows.

Each segment of the seven bar display and decimal point of upper cell 81 is electrically connected to an adjacent segment and withdrawn from cell 81 to the edge thereof by a signal wire. For example, segments a and b are connected to each other and withdrawn by a signal wire to a signal terminal α'. Similarly, segment c and the decimal point h are electrically connected and withdrawn at signal terminal δ'. Segments d and e are electrically connected and withdrawn at signal terminal α' and segment f and g are electrically connected and withdrawn at signal β'.

In first cell 81 a first common electrode COM 1 is opposed to segments f, a, d and decimal point h. A second common electrode COM 2 is opposed to remaining segments b, c, e and g. Thus, one of the two segments of each electrically connected tab is opposed to one of the common electrode in the drive system.

Referring now to FIG. 17(*b*), the patterns in second cell 82 are shown. Capital letters A–H are arranged in two rows of four each with a common electrode for each row. Similarly, adjacent letters in each row are electrically connected to a common signal wire to a common signal electrode. A, B, C and D are in a first row opposed to a first common electrode COM 1' and E, F, G and H are in a second row and opposed to a second common electrode COM 2'. Adjacent letters A and E are withdrawn by a common signal wire to signal terminal α''. Similarly, B and F are withdrawn to β'', C and G are withdrawn to α'' and D and H are withdrawn to δ''.

In this type of construction, when the common electrodes are taken out independently the first and second layers and the connected signal electrodes are taken to separate terminals, there are a total of 12 terminals. Specifically, each layer has two common electrode terminals, a total of four terminals. Each layer has four segment electrode terminals, or eight terminals. Thus, the total number of common and signal electrode terminals is 12.

By making an electrical connection between the first common electrode in each cell, COM 1 and COM 1' and the second common electrodes in each cell, COM 2 and COM 2', the number of terminals can be reduced by two to ten. In this configuration there are only two common electrode terminals. This only decreases the number of independent common terminals. In accordance with the invention, it is also possible to reduce the number of segment electrodes in first cell and second cell 82 as shown in FIG. 18.

In this embodiment of the invention, signal terminals α', β', γ', and δ', withdrawn from first cell 81 are connected to signal terminals α'', β'', γ'', and δ'', withdrawn from second cell 82. Thus, the common signal terminals α, β, γ, and δ are the only signal pattern electrodes withdrawn from the device. If COM 1 and COM 1'' are also removed as a signal terminal each signal segment electrode in first cell 81 and in second cell 82 would be completely dependent. Thus, it is not possible to arrange this configuration with the common electrodes removed in common. However, the total number of terminals withdrawn from the device is decreased from 12 to 8. Specifically, there are four common electrode terminals and four signal electrode terminals. The benefits obtained in accordance with this embodiment of the invention are even greater than shown in this illustration. For a typical liquid crystal display panels utilized in electronic wristwatches include considerably more segment electrodes than common electrodes. Accordingly, the benefits that can be obtained are quite significant.

The method of displaying the device of FIGS. 17 and 18 will now be described. The case of displaying a figure "8" by using the segment electrodes in first cell 81 will be utilized as an example. In this case, it is necessary to provide voltage waveforms which will render all segments a to g, inclusive, in first cell 81 as ON, the decimal point in an OFF condition and all segments on second cell 82 in an OFF condition. A common waveform of ½ duty and ½ bias according to the conventional generalized AC amplitude selective multiplexing method is applied to common electrodes COM 1 and COM 2 in first cell 81. In other words, the waveform of FIG. 19(*a*) is applied to COM 1 and the waveform of FIG. 19(*b*) is applied to COM 2.

The waveforms applied to segment terminals α, β, γ, and δ must be such that the figure "8" will be displayed. Specifically, in order to turn each segment a to g, inclusive, to an ON condition and the decimal point to an OFF condition, the segment wave form of FIG. 12(*c*) is applied to each terminal α, β, and γ. A segment wave form of FIG. 19(*d*) is applied to segment terminal δ. The result of application of these wave forms in combination with the wave forms applied to COM 1 and COM 2 results in that all segment electrodes electrically connected to segment terminals α, β, and γ are placed in an ON condition and electrode terminals electrically connected to segment terminal δ and opposed to COM 1, namely, the decimal point is rendered in an OFF condition. Segment c, which is also electrically connected to segment terminal δ, but is opposed to COM 2 is rendered in the ON condition. Thus, the figure "8" is displayed in upper cell 81.

When such common and segment signals are applied, the voltage wave forms applied to the liquid crystal material in the ON condition and in the OFF condition are as follows. For example, segment signal wave form of FIG. 19(*e*) is applied to segment a and the segment signal wave form of FIG. 19(*f*) is applied to the decimal point or the segment electrode in the OFF condition. The effective voltage applied to the liquid crystal material in an ON condition is referred to as $E_{ON}$ and the effective voltage applied to the liquid crystal material in the OFF condition is referred to as $E_{OFF}$. When $E_{OFF}$ is less than the threshold voltage, $V_{th}$ in a Voltage versus Contrast characteristic curve and $E_{ON}$ is larger than the saturation voltage, $V_{sat}$, the display is accomplished.

The above described driving method is in accordance with the conventional generalized AC amplitude selective multiplexing method. A problem in this type of driving method occurs when the signal applied to the common electrodes COM 1' and COM 2' in second cell 82 is the same as the signal applied to common electrodes COM 1 and COM 2, respectively, and first cell 81. In other words, in a construction wherein COM 1' and COM 2′ are electrically connected and COM 2′ and COM 2 are electrically connected, segment electrodes in second cell 82 which should be in an OFF condition would be placed in an ON condition. In the example recited above, seven of the alphabet letters would be placed in an ON condition, except the letter "D" in second cell 82. Accordingly, a signal which does not place the liquid crystal material in an ON condition regardless of the segment signal applied to segments $\alpha$, $\beta$, $\gamma$ and $\delta$ must be applied to common electrodes COM 1′ and COM 2′.

Turning to FIG. 19(*g*), a wave form applied to a common electrode which will remain in a non-selective level over the entire period is shown. By applying this signal to COM 1′ and COM 2′, the wave form of the voltage applied to segment electrodes A, B, C, E, F, G and H is shown in FIG. 19(*i*). In this case, the effective voltage applied to the liquid crystal material between both segment electrodes and the corresponding common electrodes are equal, namely, $E_M$. The relationship of $E_{OFF}$, $E_{ON}$ and $E_M$ is as follows: $E_{OFF}<E_M<E_{ON}$. In order for all segments of the display in second cell 82 to remain in an OFF condition, it is necessary that $E_M$ be less than $V_{th}$. When this condition is satisfied the display of the "8" display will be performed. In fact, this condition may be satisfied by properly selecting the liquid crystal materials when constructing the cells.

On the other hand, when it is desired to display the electrode patterns of second cell 82, the pattern electrodes in first cell 81 must be placed in OFF condition, the driving method is as follows. Specifically, the common signal of the conventional generalized AC amplitude select and multiplexing method is applied to the common electrodes COM 1′ and COM 2′ of second cell 82, while the common signal of the non-selective level of FIG. 19(*g*) is applied over the whole period to the common electrodes of first cell 81, COM 1 and COM 2. This is the common signal which was applied to the common electrodes COM 1′ and COM 2′ of second cell 82 in the previous example. By driving the cell in this manner, a display will be effected wherein the second cell 82 will be displayed as was first cell 81 in the earlier example.

The example just described that utilizes a ½ duty and ½ bias driving condition. It is contemplated to be within the scope of the invention that other duty and bias values may be utilized for the display device constructed and arranged in accordance with the invention. The only shortcoming of constructing and arranging a device in accordance with the invention is that it is difficult to display segments on first cell 81 and second cell 82 in overlapping regions. However, when the construction is applied to a device wherein regions of display of first cell 81 and second cell 82 do not overlap, by connecting segment electrodes on first cell 81 and second cell 82 in common, a substantial decrease in the number of signal wires to be removed from the device is obtained. This results in a substantial cost reduction during assembly.

By utilizing the procedures in accordance with the invention, a multi-layer liquid crystal display panel having a wide variety of uses may be designed. The invention is indispensible in designing electronic wristwatches which need be miniaturized. A wristwatch including a two layer display panel constructed and arranged in accordance with the invention is illustrated in FIG. 20(*a*) and FIG. 20(*b*). The display of one of the cells in FIG. 20(*a*) displays a display of actual time in hours, minutes and seconds, a day of week display and a month and date display. In FIG. 20(*b*) the second cell displays the full calendar month. In this construction the month and year display of FIG. 20(*b*) utilizes the display segments on the same cell as the month and date display of FIG. 20(*a*). Thus, in this construction the wristwatch illustrated in FIGS. 20(*a*) and 20(*b*), the invention is utilized in non-overlapping regions, namely, the time and calendar display regions and is used in overlapping regions for the month and date and month and year displays.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A multi-layer liquid crystal display device comprising at least two liquid crystal display cells overlapping in plan view, each said display cell for selectively displaying a display of at least one character with the display in each cell at least in part overlapping along a line of sight, and each cell including two opposed transparent panels in spaced relation formed with segmented pattern transparent electrode means deposited on the interior surface of one of said panels for forming said display and at least one common electrode means on the opposed panel opposite at least a portion of said segmented pattern electrode means and a liquid crystal material in the space between said panels adapted to have regions thereof rendered visually distinguishable from the remainder of said material when a predetermined voltage is selectively applied across the opposed regions of pattern and common electrode means, portions of the segmented pattern electrode means of one of said layers being electrically connected to portions of the segmented pattern electrode means in another of said layers with said connection outside the space between said panels, the common electrode means in each cell formed independently and not electrically connected with each other and multiplexed driving circuit means for generating segment signals for application to said segmented pattern electrode means and common signals for application to each said common electrode means, said segment and common signals for selectively energizing at least a portion of said electrode means for displaying at least one of said characters, and at least one of said common signals being an OFF signal when applied to a common electrode means to prevent the portion of the display associated with said common electrode means from being placed in an ON condition regardless of the segment signal applied to the opposed segmented electrode means.

2. The display device of claim 1, wherein said segmented pattern display means included a seven bar display.

3. The display device of claim 2, including signal wires for electrically connecting at least two adjacent segments of said segmented pattern display within the region of material and said opposed panel including two common electrode means said connected segments opposed to different common electrode means.

4. The display device of claim 3, wherein a second cell includes pattern electrode means arranged in a matrix-type display pattern, and said matrix-type display including a signal wire for electrically connecting two adjacent display regions within the region of material, and two common electrode means on the opposed panel, said matrix signal wires electrically connected to a signal wire from the cell having the segmented display pattern.

5. The display device of claim 4 including two cells with a common intermediate panel, the first cell being the upper cell and including a plurality of characters arranged in a predetermined fashion for providing informational displays, the second cell being a lower cell and including a plurality of characters formed in a matrix-type display pattern for providing additional informational displays.

6. The display device of claims 1 or 3, wherein said pattern electrode means in at least one cell is arranged in a matrix-type display pattern.

7. The display device of claim 1, wherein the electrically connected display patterns are in non-overlapping relation with each other.

8. The display device of claim 7, wherein at least two adjacent segments of said segmented display are electrically connected to each other within the region of material and said cell includes two common electrodes, each of said connected segments being opposed to a different common electrode.

9. The display device of claim 8 including two cells, each cell having at least one character with two adjacent segments of said segmented pattern display being electrically connected within the region of material, each cell including at least two common electrodes, each of said connected segments being opposed to a different common electrode means.

10. The display device of claim 1, wherein each said cell includes signal wire means for electrically connecting electrode means outside the region of material, one panel in each cell extending beyond the opposed panel for providing a non-opposed overlapping region having said signal wires thereon, said device further including a circuit substrate and resilient conductive means, said resilient conductive means disposed between said extended non-overlapping region of said panels and said circuit substrate for electrically connecting said electrode means to said circuit substrate.

11. The display device of claim 10, including an upper cell and a lower cell for forming a device of two cells with the lower panel in the upper cell and the upper panel in the lower cell in common, a region of the upper panel in each layer extending beyond the opposed lower panel for providing extended regions for contacting said resilient conductive means.

12. The display device of claim 10, including an upper cell and a lower cell for forming a device of two cells with the lower panel in the upper cell and the upper panel in the lower cell in common, a region of the upper panel of the upper layer and the lower panel of the lower layer extending beyond said common panel in an overlapping region for forming extended regions in said panel, said resilient conductive means disposed between said extended regions and said substrate.

13. The display device of claim 10, wherein each cell includes signal wire means for electrically connecting electrode means outside the region of material, the common panel extending beyond the upper panel of the upper cell and the lower panel of the lower cell in an overlapping region for forming extended regions in each cell, said resilient conductive means disposed about the extended region of the common panel and said substrate.

14. The display device of claims 11, 12 or 13, wherein said display cells are substantially rectangular in shape having four sides, sand extended regions of said panels formed along the sides of said panels.

15. A digital display electronic wristwatch, the improvement in which comprises liquid crystal display means including at least two liquid crystal display cells overlapping in plan view, each said display for selectively displaying a display of at least one character with the display in each cell at least in part overlapping along a line of sight, and each cell including two opposed transparent panels in spaced relation formed with segmented pattern transparent electrode means deposited on the interior surface of one of said panels for forming said display and at least one common electrode means on the opposed panel opposite at least a portion of said segmented pattern electrode means and a liquid crystal material in the space between said panels adapted to have regions thereof rendered visually distinguishable from the remainder of said material when a predetermined voltage is selectively applied across the opposed regions of pattern and common electrode means, portions of the segmented pattern electrode means of one of said layers being electrically connected to portions of the segmented pattern electrode means in another of said layers with said connection outside the space between said panels, the common electrode means in each cell formed independently and not electrically connected with each other and multiplexed driving circuit means for generating segment signals for application to said segmented pattern electrode means and common signals for application to each said common electrode means, said segment and common signals for selectively energizing at least a portion of said electrode means for displaying at least one of said characters, and at least one of said common signals being an OFF signal when applied to a common electrode means to prevent the portion of the display associated with said common electrode means from being placed in an ON condition regardless of the segment signal applied to the opposed segmented electrode means.

16. The timepiece of claim 15, including two liquid crystal display cells, a first upper display cell including a plurality of characters formed in a seven bar display fashion and a second lower layer wherein the pattern electrode means are arranged in a matrix-type display pattern, both cells including signal wires for electrically connecting adjacent pattern electrodes in each cell to each other and to selected pattern electrodes in the other cell.

17. The timepiece of claim 16, wherein the characters in the upper cell selectively display a display of at least actual time and the matrix display characters in the second cell display at least a complete calendar month.

* * * * *